United States Patent [19]

Judd

[11] 4,370,307

[45] Jan. 25, 1983

[54] PREPARATION OF PURE MAGNESIAN VALUES

[75] Inventor: George G. Judd, Woodville, Ohio

[73] Assignee: Martin Marietta Corporation, Bethesda, Md.

[21] Appl. No.: 192,301

[22] Filed: Oct. 9, 1980

Related U.S. Application Data

[63] Continuation-in-part of Ser. No. 126,005, Feb. 29, 1980, abandoned.

[51] Int. Cl.³ .......................... C01F 5/24; C01F 11/18
[52] U.S. Cl. .................................... 423/432; 423/165; 423/169
[58] Field of Search ................. 423/430, 432, 169, 165

[56] References Cited

U.S. PATENT DOCUMENTS

| | | | |
|---|---|---|---|
| 1,900,235 | 3/1933 | Greider | 423/165 |
| 2,390,095 | 12/1945 | Gloss | 423/165 |
| 2,458,847 | 1/1949 | Gloss | 423/165 |
| 2,583,331 | 1/1952 | Gloss | 423/165 |
| 2,630,371 | 3/1953 | Mower | 423/432 |
| 3,402,017 | 9/1968 | Ruiz | 423/165 |
| 4,179,490 | 12/1979 | Judd | 423/165 |

FOREIGN PATENT DOCUMENTS

| | | | |
|---|---|---|---|
| 560600 | 4/1944 | United Kingdom | 423/169 |
| 629262 | 9/1949 | United Kingdom | 423/165 |
| 1529230 | 10/1978 | United Kingdom | 423/165 |

OTHER PUBLICATIONS

Evans et al, Carbonation of Aqueous Suspensions Containing Magnesium Oxides or Hydroxides, I & EC vol. 41, #12, Dec. 1949, pp. 2814–2817.

Smithson et al, Kinetics and Mechanism of Carbonation of Magnesium Oxide Slurries, Ind. Eng. Chem. Process Des. Develop, vol. 12 #1, 1973, 99–106.

Lawrence et al, Equilbrium & Kinetics for Carbonation of Magnesium Hydroxide Slurries, U.S. Dept. of Interior, R & D Development Progress Rpt. #754, Dec. 1971.

Chesny, Magnesium Compounds from Ocean Water, I & EC vol. 28, #4, Apr. 1936, pp. 383–390.

Primary Examiner—Gary P. Straub
Attorney, Agent, or Firm—John C. Purdue

[57] ABSTRACT

A method for recovering a magnesium carbonate of high purity from an aqueous magnesium hydroxide slurry is disclosed. The slurry contains at least 1 percent of magnesium hydroxide and consists of water, magnesium hydroxide and impurities normally associated with magnesium hydroxide slurries. The method involves carbonating the slurry with sufficient carbon dioxide to dissolve a substantial proportion of the magnesium hydroxide therein as magnesium bicarbonate, continuing carbonation until a solution saturated with magnesium bicarbonate is formed, a portion of the magnesium bicarbonate is converted to a crystalline magnesium carbonate and substantially all dissolved calcium is precipitated, so that the slurry contains dissolved magnesium bicarbonate, a crystalline magnesium carbonate precipitate and a calcium carbonate precipitate. Solids are then separated from the magnesium bicarbonate solution, the solution is decarbonated, for example by heat or vacuum, and hydrous magnesium carbonate is separated from the aqueous phase.

5 Claims, No Drawings

PREPARATION OF PURE MAGNESIAN VALUES

REFERENCE TO RELATED APPLICATION

This is a continuation-in-part of application Ser. No. 126,005, filed Feb. 29, 1980, now abandoned.

BACKGROUND OF THE INVENTION

Magnesium oxide is a commercially important compound, being used in comparatively high purity for the production of refractories employed, for example, in the basic oxygen steel making process, and, in still higher purities, as a basic filler and for medicinal purposes. Historically, magnesium oxide has been produced by calcining magnesite, a naturally occurring magnesium carbonate, and, more recently, from magnesium hydroxide precipitated from sea water, brines, bitterns, and wastes from desalination plants.

Even for refractory uses, there is a need for increasingly pure magnesium oxide, particularly for specialty refractories used in basic oxygen steel making vessels.

While there are some natural magnesite deposits presently being worked, and yielding magnesium oxide which is extremely low in highly detrimental impurities such as boron oxide, relatively extreme beneficiation procedures are necessary to produce magnesium oxide of greater than about 96 percent* MgO content from such deposits.

*The terms "percent" and "parts" are used herein, and in the appended claims, to refer to percent and parts by weight, unless otherwise indicated.

The need of industry for magnesium oxide assaying greater than about 97 percent, and a substantial portion of the demands for less pure magnesium oxide, are supplied by precipitating magnesium oxide from sea water, brine, bitterns and waste from desalination plants. The precipitation is usually carried out by adding lightly burned dolomite to sea water or the like to bring the pH to a value on the basic side at which magnesium hydroxide is precipitated. Ultimately, after numerous processing steps, the precipitated magnesium hydroxide is recovered as an aqueous slurry which may contain as much as about 50 percent of magnesium hydroxide. Although magnesium hydroxide precipitated from sea water or the like can rather readily be recovered in sufficient purity to produce burned magnesium oxide containing up to about 98 percent of MgO, this process tends to produce a final product contaminated with undesirably high proportions of boron oxide, a highly undesirable constituent of magnesium oxide used as an insulating material with electrical heating elements and in producing magnesite refractories. While it has been found to be possible to reduce the boron oxide content of the final product, this can be done only by increasing to an undesirably high extent the content of at least one other impurity, by undesirably increasing the cost, or by a technique which is in some way detrimental or undesirable. Accordingly, there remains a need for an inexpensive way to increase the purity of magnesium oxide products, particularly those recovered by precipitation from sea water and the like.

BRIEF DESCRIPTION OF THE INVENTION

The instant invention is based upon the discovery of a method for recovering extremely high purity magnesium carbonate from a magnesium hydroxide slurry. The magnesium hydroxide slurry can be produced in any conventional way, for example by adding lightly burned dolomite or lime, preferably the former, to sea water or the like to precipitate magnesium hydroxide, and then processing the precipitated hydroxide in a conventional way. The slurry can also be produced by suspending in water burned magnesite, burned dolomite or other natural or processed materials which will form magnesium hydroxide that can be carbonated. Materials which form slurries containing less than about 90 percent of magnesium oxide, on a dry solids basis, are comparatively undesirable because they usually contain substantial amounts of water-soluble impurities which contaminate the final product and, in addition, are expensive because they require large quantities of high purity carbon dioxide. The method of the invention involves carbonating a magnesium hydroxide slurry to produce magnesium bicarbonate, and then continuing the carbonation to convert a part of the magnesium bicarbonate to a crystalline magnesium carbonate so that the slurry contains both dissolved magnesium bicarbonate and a crystalline magnesium carbonate precipitate. Insoluble material is subsequently removed from the carbonated slurry by filtration, and the filtrate is decarbonated, for example by heating, vacuum, or both. Finally, hydrous magnesium carbonate of high purity, which is precipitated as a result of the decarbonation, is recovered, for example by filtration.

Accordingly, it is an object of this invention to provide an improved method for preparing a magnesium carbonate of high purity from a magnesium hydroxide slurry.

Other objects and advantages will be apparent from the following detailed description, which is intended only to illustrate and disclose but in no way to limit the invention as defined in the claims appended hereto.

DETAILED DESCRIPTION OF THE INVENTION

This invention relates to an improved method for recovering a magnesium carbonate of extremely high purity from an aqueous magnesium hydroxide slurry. The slurry must contain at least 1 percent of magnesium hydroxide and consist of water, magnesium hydroxide and impurities normally associated with magnesium hydroxide slurries, for example silica and calcium oxide. The method involves the steps of carbonating the slurry with sufficient carbon dioxide to dissolve a substantial proportion of the magnesium hydroxide therein as magnesium bicarbonate, and continuing carbonation until a portion of the magnesium bicarbonate is converted to a crystalline magnesium carbonate precipitate. At this point in the reaction, substantially all of the calcium is precipitated, so that the slurry is composed almost entirely of dissolved magnesium bicarbonate and a crystalline magnesium carbonate precipitate and precipitated calcium carbonate. The crystalline magnesium carbonate, the calcium carbonate and other solids are then separated, for example by filtration, from the resulting magnesium bicarbonate solution. Next, the magnesium bicarbonate filtrate is decarbonated, for example by heat, vacuum, or both, thereby precipitating hydrous magnesium carbonate, which is recovered from the aqueous phase, for example by filtration. The magnesium carbonate recovered is substantially devoid of calcium as an impurity, i.e., containing less than one percent on an oxide basis, preferably less than one-half percent.

The following dynamic equilibria have been disclosed in Smithson and Bakhshi, "Kinetics and Mechanism of Carbonation of Magnesium Oxide Slurries," Ind. Eng. Chem. Process Des. Develop., Vol. 12, No. 1 (1973), at page 104, as being involved in an aqueous carbon dioxide/magnesium hydroxide system:

$$CO_2(gas) + H_2O (liquid) \rightleftharpoons CO_2(aqueous) \quad (1)$$

$$CO_2(aqueous) + OH^- \rightleftharpoons HCO_3^- \quad (2)$$

$$CO_2(aqueous) + H_2O \rightleftharpoons H^+ + HCO_3^- \quad (3)$$

$$Mg(OH)_2(solid) + 2CO_2(aqueous) \rightleftharpoons Mg^{++} + 2HCO_3^- \quad (4)$$

$$Mg(OH)_2(solid) + 2H^+ \rightleftharpoons Mg^{++} + 2H_2O \quad (5)$$

The foregoing equilibria are believed to indicate that, initially, a magnesium bicarbonate in solution is formed when aqueous magnesium hydroxide is carbonated according to the invention*. This belief has been corroborated by careful observation of the carbonation of aqueous magnesium hydroxide slurries; no initial carbonate precipitate has been observed. It is therefore believed that there is a dynamic equilibrium from which the comparatively insoluble magnesium carbonate does not begin to precipitate until a saturated solution of magnesium bicarbonate is achieved. Such precipitation can occur according to the following equation:

$$Mg^{++} + 2HCO_3^- + x\,H_2O \rightleftharpoons MgCO_3 \cdot x\,H_2O + H^+ + HCO_3^-$$

*See the Smithson and Bakhshi article, supra, pp. 104,105.

During carbonation of a magnesium hydroxide slurry according to the invention, it is believed that some dissolved magnesium carbonate trihydrate is formed, but reacts so rapidly that there is no magnesium carbonate precipitate until after a saturated magnesium bicarbonate solution has been formed. Prior to carbonate precipitation both bicarbonate and carbonate species are believed to exist in equilibrium. Impurities with low solubilities, for example calcium, have been found to precipitate from the saturated bicarbonate solution with carbonate precipitate, for example as calcium carbonate. Therefore, when carbonation is properly continued to the point of precipitation of a crystalline magnesium carbonate, very little, if any, relatively insoluble impurities such as calcium remain in solution in the slurry.*
*The solubility of magnesium carbonate trihydrate is 1.6 g per liter at 25 degrees C. By comparison, the solubility of calcium carbonate is 0.014 g per liter at that temperature.

The instant invention is not limited by or to the aforementioned theoretical considerations, as hydrous magnesium carbonate of high purity can be produced expeditiously and relatively inexpensively so long as carbonation is carried out to form a saturated solution of magnesium bicarbonate and then to precipitate hydrous magnesium carbonate from that solution.

The method of the invention will be apparent to those skilled in the art from the following Examples.

EXAMPLE 1

A 1 liter beaker was charged with 500 ml water at about 20 degrees C. and 20 g. magnesium hydroxide, on a dry solids basis, added as a 50 percent aqueous slurry of magnesium hydroxide. The specific magnesium hydroxide slurry used was 96 grade material, having a nominal MgO content, on a dry basis, of 96 percent, and containing about 3½ percent CaO and about 200 parts per million of boron oxide, balance aluminum oxide, silicon dioxide(s) and iron oxides. The aqueous slurry in the beaker was agitated with a propeller-type agitator and carbon dioxide, a total of about 60 g, was bubbled into the stirred aqueous slurry at a rate of about 1 liter per minute. Exothermic reaction between the carbon dioxide, magnesium hydroxide and, possibly, other constituents of the slurry caused a noticeable increase in the temperature to above 30 degrees C. and a gradual diminution in the amount of precipitate discernible; some precipitate remained at the end of the carbonation. Solids were then separated from the reaction mixture by filtration, and the filtrate was heated to a temperature of about 60 degrees C. to cause decarbonation. An immediate light precipitate appeared throughout the liquid; after about five minutes at 60 degrees C. this precipitate was recovered by filtration, washed and assayed. The precipitate was found by wet chemistry to contain, on an oxide basis, 99.74 percent of MgO and 0.12 percent of CaO. The sum of silicon dioxide(s), aluminum oxide, iron oxides and boron oxide (by difference) was 0.14 percent. It was estimated that the boron oxide content was negligible, less than 20 parts per million, and that the recovery of hydrous magnesium carbonate accounted for about one-half of the magnesium hydroxide in the original slurry. The first precipitate was found by wet chemistry to contain, on an oxide basis, 90.75 percent of MgO and 6.43 percent CaO, the sum of silicon, aluminum, iron and boron oxides being 2.82 percent (by difference). Analysis by means of an atomic absorption spectometer indicated CaO in the first precipitate to be 7.3 percent and in the final precipitate to be 0.23 percent. The foregoing Example constitutes the best mode presently known to the inventor.

It will be appreciated that the method described in the preceding Example involved the use of a large excess of carbon dioxide over that required to convert the magnesium hydroxide charged to magnesium bicarbonate. As stated, the slurry contained 20 g magnesium hydroxide (0.343 g-mole), 3½ percent of CaO and about 200 parts per million of boron oxide. The 20 grams of magnesium hydroxide were equivalent to 13.82 grams of MgO, so that CaO amounted to 0.53 gram (0.009 g-mole) while boron oxide amounted to 0.0029 gram. This left a balance of 0.0471 gram, made up of aluminum, silicon, and iron oxides. The carbonation was with 60 g (1.363 g-moles) of carbon dioxide, so that the mole ratio of carbon dioxide to magnesium hydroxide plus calcium hydroxide was 3.87:1, or almost two times the amount theoretically required to convert all of the magnesium hydroxide and all of the calcium hydroxide in the slurry to the respective bicarbonates:

$$Mg(OH)_2 + 2CO_2 \rightarrow Mg(HCO_3)_2$$

$$Ca(OH)_2 + 2CO_2 \rightarrow Ca(HCO_3)_2$$

It will be appreciated from the foregoing stoichometric considerations that the procedure described above in Example 1 involved carbonation to convert substantially all of the calcium and magnesium charged to the respective bicarbonates and then substantial further carbonation. As a consequence of such carbonation it is believed that dissolved magnesium bicarbonate is initially formed which exists in equilibrium with a dissolved magnesium carbonate; crystalline magnesium carbonate trihydrate is then precipitated, together with calcium carbonate, from the saturated solution. It will be appreciated, therefore, that the precipitate which remained at the end of the carbonation, as described above, was crystalline magnesium carbonate trihydrate, together with calcium carbonate. Conducting the carbonation so that crystalline magnesium carbonate trihydrate was present at the conclusion thereof was responsible for the high purity of the product recovered by the procedure of Example 1; when crystalline magnesium carbonate trihydrate is precipitated, because it is about thirty-two times as soluble as calcium carbonate, the reaction slurry is nearly devoid of dissolved calcium cations and, after separation of solids and decarbonation, high purity hydrous magnesium carbonate can be recovered as described in Example 1.

The magnesium hydroxide slurry described in Example 1 was also carbonated by two procedures according to the instant invention, both differing from the procedure described above in Example 1. The procedure described in Example 2, below, constitutes a partial carbonation.

EXAMPLE 2

A 1 liter beaker was charged with 500 ml water at about 20 degrees C. and 20 g magnesium hydroxide, on a dry solids basis, added as the 50 percent aqueous slurry identified in Example 1, above. The aqueous slurry in the beaker was agitated with a propeller-type agitator and carbon dioxide, a total of about 35 g, was bubbled into the stirred aqueous slurry at a rate of about 1 liter per minute until the water in the beaker contained about 17 g per liter of dissolved magnesium bicarbonate. At the end of the carbonation both a flocculent precipitate (magnesium hydroxide) and a crystalline precipitate (magnesium carbonate) could be observed in the beaker. Close examination indicated that the crystalline precipitate was dissolving and new crystalline precipitate was forming; this is believed to indicate that there was a dynamic equilibrium between dissolved magnesium bicarbonate and a crystalline magnesium carbonate, probably the trihydrate, nesquehonite. Solids, a large amount of magnesium hydroxide and a comparatively small amount of the crystalline magnesium carbonate, were then removed by filtration; the filtrate was then heated to a temperature of about 60 degrees C. to cause decarbonation. An immediate light precipitate appeared throughout the liquid; after about five minutes at 60 degrees C. this precipitate was recovered by filtration, washed and assayed. The precipitate was found to contain, on an oxide basis, 99.58 percent of MgO and 0.42 percent of CaO. It was estimated that the boron oxide content was negligible, less than 20 parts per million, and that the recovery of hydrous magnesium carbonate accounted for about ¼ of the magnesium hydroxide in the original slurry. The first precipitate was found to contain, on an oxide basis, 96.13 percent of MgO, 1.96 percent of CaO, 0.78 percent of aluminum oxide and iron oxides, and 0.85 percent of silicon dioxide(s) and insolubles.

EXAMPLE 3

A 1 liter beaker was charged with 500 ml water at about 20 degrees C. and 10 g magnesium hydroxide, on a dry solids basis, added as the aqueous slurry of magnesium hydroxide identified above in Example 1. The aqueous slurry in the beaker was agitated with a propeller-type agitator and carbon dioxide, a total of about 16 g, was bubbled into the stirred aqueous slurry at a rate of about 1 liter per minute until most of the flocculent magnesium hydroxide precipitate had disappeared; the beaker contained an appreciable amount of the crystalline precipitate to which reference has been made above. Solids were then separated from the reaction mixture by filtration, and the filtrate was heated to a temperature of about 60 degrees C. to cause decarbonation. An immediate light precipitate appeared throughout the liquid; after about five minutes at 60 degrees C. this precipitate was recovered by filtration, washed and assayed. The precipitate was found to contain, on an oxide basis, 99.21 percent of MgO and 0.48 percent of CaO. The sum of silicon, aluminum, iron and boron oxides (by difference) was 0.31 percent. It was estimated that the boron oxide content was negligible, less than 20 parts per million, and that the recovery of hydrous magnesium carbonate accounted for about 95 percent of the magnesium hydroxide in the original slurry. The first precipitate was found to contain, on an oxide basis, 36.10 percent of MgO, 17.51 percent of CaO, 25.52 percent of aluminum oxide and iron oxides and 17.29 percent of silicon dioxide(s) and insolubles.

It will be appreciated that the method of the instant invention, as embodied in the foregoing Examples, is admirably suited for producing a high quality stream of magnesium carbonate, magnesium oxide or the like from a magnesium hydroxide stream as presently being produced commercially from sea water, brine, bitterns and effluent from desalination plants. For example, a stream amounting to ½ to 20 percent of the magnesium hydroxide slurry which would otherwise be the final product of such an operation can be processed in accordance with the present invention to produce the high quality magnesium carbonate, magnesium oxide or the like. The precipitate from the first carbonation can merely be returned to the main body of magnesium hydroxide slurry and sold as a portion thereof. While such a procedure will increase the impurity content of the technical magnesium hydroxide slurry, the increase will not be material in the context of the uses made of such slurries. The impurities normally present in magnesium hydroxide slurries are silica, calcium oxide, alumina, iron oxides and trace impurities such as boron oxide and titanium oxide. Silica usually ranges from about ¼ percent to about 2 percent, on an oxide basis, calcium oxide from about ½ percent to about 1½ percent, iron oxides and alumina from about ¼ percent to about 1 percent, each, boron oxide less than about 0.3 percent and titanium oxide less than about 0.1 percent. Other trace impurities may be present, and, for refractory applications, in particular, the CaO content may be increased by deliberate additions of lime or dolomite to achieve particular results. Magnesium hydroxide slurries recovered from brines usually have silica contents in the lower portion of the indicated range, for example from about ½ percent to 1 percent, while those recovered from sea water may have the higher silica contents indicated.

It will be apparent that various changes and modifications can be made from the process as disclosed in the foregoing Examples without departing from the spirit and scope of the invention as defined in the following claims.

What I claim is:

1. A method for recovering a magnesium carbonate of high purity containing, on an oxide basis, at least 99 percent of magnesium carbonate and not more than 1 percent of calcium carbonate, from an aqueous magnesium hydroxide slurry consisting of water, commercially produced magnesium hydroxide and impurities normally associated with said magnesium hydroxide, and containing an amount of magnesium hydroxide, at least 1 percent, sufficient to form a solution saturated with magnesium bicarbonate and containing a crystalline magnesium carbonate precipitate, said method involving the steps of carbonating the slurry with sufficient carbon dioxide to dissolve a substantial proportion of the magnesium hydroxide therein as magnesium bicarbonate, continuing carbonation under conditions of temperature, time and pressure such that a solution saturated with magnesium bicarbonate and containing an appreciable amount of a crystalline magnesium carbonate precipitate is formed and substantially all calcium present is precipitated so that the slurry contains dissolved magnesium bicarbonate, the crystalline magnesium carbonate precipitate and a calcium carbonate precipitate, separating crystalline magnesium carbonate and other solids from the slurry to recover a solution saturated or essentially saturated with magnesium bicarbonate, decarbonating the magnesium bicarbonate solution to precipitate hydrous magnesium carbonate therein, and separating hydrous magnesium carbonate from the aqueous phase.

2. A method as claimed in claim 1 wherein the magnesium hydroxide slurry which is carbonated is a portion of a process stream of magnesium hydroxide and wherein the precipitate separated after carbonation is returned to the main magnesium hydroxide process stream.

3. A method as claimed in claim 1 wherein the magnesium bicarbonate solution is decarbonated by heat.

4. A method as claimed in claim 1 wherein the magnesium bicarbonate solution is decarbonated by vacuum.

5. A method as claimed in claim 1 wherein the magnesium bicarbonate solution is decarbonated by a combination of heat and vacuum.

* * * * *